United States Patent
Hwang et al.

(12)

(10) Patent No.: US 12,555,849 B2
(45) Date of Patent: Feb. 17, 2026

(54) SECONDARY BATTERY AND METHOD FOR REPAIRING THE SAME

(71) Applicant: LG Energy Solution, Ltd., Seoul (KR)

(72) Inventors: Won Pill Hwang, Daejeon (KR); Sang Woo Lee, Daejeon (KR); Su Taek Jung, Daejeon (KR); Sang Ho Bae, Daejeon (KR); Min Cheol Choi, Daejeon (KR); Jin Gon Kim, Daejeon (KR); Yong Jun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 646 days.

(21) Appl. No.: 17/918,761

(22) PCT Filed: Apr. 26, 2021

(86) PCT No.: PCT/KR2021/005269
§ 371 (c)(1),
(2) Date: Oct. 13, 2022

(87) PCT Pub. No.: WO2021/235717
PCT Pub. Date: Nov. 25, 2021

(65) Prior Publication Data
US 2023/0133623 A1 May 4, 2023

(30) Foreign Application Priority Data
May 18, 2020 (KR) .................. 10-2020-0059394

(51) Int. Cl.
*H01M 50/105* (2021.01)
*H01M 50/124* (2021.01)

(52) U.S. Cl.
CPC ..... *H01M 50/1245* (2021.01); *H01M 50/105* (2021.01)

(58) Field of Classification Search
CPC .................. H01M 50/1245; H01M 50/105
See application file for complete search history.

(56) References Cited

U.S. PATENT DOCUMENTS

| 2003/0217452 | A1 | 11/2003 | Talwar |
| 2006/0164647 | A1* | 7/2006 | Shibata .................. G01N 21/89 382/141 |
| 2011/0033728 | A1 | 2/2011 | Smith |
| 2012/0156551 | A1 | 6/2012 | Cho |

(Continued)

FOREIGN PATENT DOCUMENTS

| AU | 2010229320 A1 | 10/2011 |
| CN | 102438823 A | 5/2012 |

(Continued)

OTHER PUBLICATIONS

KPO decision to grant a Patent for KR 20200059394 (Year: 2025).*

(Continued)

*Primary Examiner* — Alexander Usyatinsky
(74) *Attorney, Agent, or Firm* — Lerner David LLP (57) ABSTRACT

A method for repairing a secondary battery according to an embodiment of the present invention for solving the above problems includes: a step, in which cracks are formed in an outer surface of a battery case of the pouch-type secondary battery; a step of locally applying a metal solution to the cracks; and a step of drying the metal solution to form a coating part.

5 Claims, 7 Drawing Sheets

(56) References Cited

U.S. PATENT DOCUMENTS

| | | |
|---|---|---|
| 2012/0308862 A1 | 12/2012 | Shibata |
| 2013/0225640 A1 | 8/2013 | Kim |
| 2014/0099534 A1 | 4/2014 | Cho |
| 2014/0242270 A1 | 8/2014 | Swarup |
| 2014/0377636 A1 | 12/2014 | Sung |
| 2015/0024263 A1* | 1/2015 | Han ................. H01M 10/0436 429/185 |
| 2016/0133883 A1 | 5/2016 | Hwang |
| 2016/0133884 A1 | 5/2016 | Hwang |
| 2017/0288181 A1 | 10/2017 | Hwang et al. |

FOREIGN PATENT DOCUMENTS

| | | |
|---|---|---|
| CN | 104040752 A | 9/2014 |
| CN | 104612253 A | 5/2015 |
| CN | 207839295 U | 9/2018 |
| JP | H02-249639 A | 10/1990 |
| JP | 2004055171 A | 2/2004 |
| JP | 2005259534 A | 9/2005 |
| JP | 2007227121 A | 9/2007 |
| JP | 2009193729 A | 8/2009 |
| JP | 2012248477 A | 12/2012 |
| JP | 2015507828 A | 3/2015 |
| KR | 20040036544 A | 4/2004 |
| KR | 20110115584 A | 10/2011 |
| KR | 20120046596 A | 5/2012 |
| KR | 20120067734 A | 6/2012 |
| KR | 20130005886 A | 1/2013 |
| KR | 20130063709 A | 6/2013 |
| KR | 20130005886 * | 10/2013 |
| KR | 101421532 * | 7/2014 |
| KR | 101421532 B1 | 7/2014 |
| KR | 20150010481 A | 1/2015 |
| KR | 20150113141 A | 10/2015 |
| KR | 20160054264 A | 5/2016 |
| KR | 20160054265 A | 5/2016 |
| KR | 20170111856 A | 10/2017 |
| KR | 20180095294 A | 8/2018 |
| KR | 20180097231 A | 8/2018 |
| KR | 20190126617 A | 11/2019 |
| TW | 200632310 A | 9/2006 |
| WO | 2010110874 A1 | 9/2010 |

OTHER PUBLICATIONS

JPO Decision to grant a patent for JP.2022559728. (Year: 2023).*
Search Report dated Feb. 6, 2024 from the Office Action for Chinese Application No. 202180029373.X issued Feb. 8, 2024, 3 pages.
International Search Report for PCT/KR2021/005269 mailed Aug. 6, 2021. 3 pgs.
Extended European Search Report including Written Opinion for Application No. 21808656.9 dated Jun. 21, 2024. 8 pgs.

* cited by examiner

SECONDARY BATTERY AND METHOD FOR REPAIRING THE SAME

CROSS-REFERENCE TO RELATED APPLICATION

The present application is a national stage entry under 35 U.S.C. § 371 of International Application No. PCT/KR2021/005269, filed on Apr. 26, 2021, which claims priority to Korean Patent Application 10-2020-0059394, filed on May 18, 2020, the disclosures of which are hereby incorporated by reference in their entireties.

TECHNICAL FIELD

The present invention relates to a secondary battery and a method for repairing the same, and more particularly, to a secondary battery, in which when cracks are formed in an outer surface of a pouch-type battery case, the cracks are repaired to minimize penetration of moisture or a gas from the outside through the cracks and to prevent an electrolyte from leaking from the inside to the outside through the cracks, and a method for repairing the same.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In general, in order to manufacture the lithium secondary battery, first, electrode active material slurry is applied to a positive electrode collector and a negative electrode collector to manufacture a positive electrode (cathode) and a negative electrode (anode). Then, the electrodes are laminated on both sides of a separator form an electrode assembly. Also, the electrode assembly is accommodated in a battery case, and then the battery case is sealed after an electrolyte is injected therein.

Such a secondary battery is classified into a pouch-type secondary battery and a can type secondary battery according to a material of a battery case accommodating an electrode assembly. In the pouch-type secondary battery, the electrode assembly is accommodated in a pouch made of a flexible polymer material having a variable shape. Also, in the can type secondary battery, an electrode assembly is accommodated in a case made of a metal or plastic material having a predetermined shape.

The pouch-type battery case is manufactured by performing drawing-molding on a pouch film having flexibility to form a cup part. The drawing-molding is performed by inserting a pouch film into a press and applying a pressure to the pouch film through a punch to stretch the pouch film. In addition, when the cup part is formed, an electrode assembly is accommodated in an accommodation space of the cup part, and then, the battery case is folded to seal a sealing part, thereby manufacturing a secondary battery.

Such a pouch-type battery case is made of a flexible material, the pouch-type battery case has an advantage of being easy to be molded and having excellent energy efficiency compared to a volume due to the thin thickness. On the other hand, since rigidity is relatively low, the pouch-type battery case may be easily broken, such as cracks formed by a sharp object from the outside. There is a problem in that moisture or a gas is penetrated from the outside through the cracked portion, or the electrolyte leaks from the inside to the outside.
(Patent Document 1)
Japanese Patent Publication No. 2009-193729

DISCLOSURE OF THE INVENTION

Technical Problem

An object of the present invention for solving the above problems is to provide a secondary battery, in which when cracks are formed in an outer surface of a pouch-type battery case, the cracks are repaired to minimize penetration of moisture or a gas from the outside through the cracks and to prevent an electrolyte from leaking from the inside to the outside through the cracks, and a method for repairing the same.

The objects of the present invention are not limited to the aforementioned object, but other objects not described herein will be clearly understood by those skilled in the art from descriptions below.

Technical Solution

A secondary battery according to an embodiment of the present invention for solving the above problems includes: an electrode assembly formed by alternately stacking electrodes and separators; a pouch-type battery case configured to accommodate the electrode assembly therein; and a coating part containing metal particles and formed to be locally applied to an outer surface of the battery case.

Also, the coating part may be formed to be applied to a crack formed in the outer surface of the battery case.

Also, the crack may be formed in edges or corners of the battery case.

Also, the coating part may include aluminum.

Also, the coating part may include: a first coating part containing a colored dye; and a second coating part containing metal particles and formed on an outer surface of the first coating part.

Also, the first coating part may be relatively widely formed, and the second coating part may be relatively narrowly formed.

A method for repairing a secondary battery according to an embodiment of the present invention for solving the above problems includes: a step, in which cracks are formed in an outer surface of a battery case of the pouch-type secondary battery; a step of locally applying a metal solution to the cracks; and a step of drying the metal solution to form a coating part.

Also, in the step, in which the cracks are formed, the battery case may include: a surface protection layer made of a polymer and formed at the outermost layer; a sealant layer made of a polymer and formed at the innermost layer; and a gas barrier layer made of a metal and stacked between the surface protection layer and the sealant layer.

Also, in the step, in which the cracks are formed, the cracks may be formed in the surface protection layer and the gas barrier layer.

Also, the metal layer may include aluminum.

Also, in the step of applying the metal solution, the metal solution may be applied through at least one of spray coating, roll coating, dip coating, slide coating, spin coating, curtain coating, slot coating, or gravure coating.

Also, in the step of applying the metal solution, the metal solution may be applied on the outer surface of the battery case in a spray coating method.

Also, the method may further include, before the step of applying the metal solution, a step of applying a colored solution to which a colored dye is added.

Also, in the step of forming the coating part, the metal solution may be dried for 20 hours to 28 hours.

Particularities of other embodiments are included in the detailed description and drawings.

Advantageous Effects

According to the embodiments of the present invention, there are at least the following effects.

The metal solution may be locally applied to the cracks formed in the outer surface of the pouch-type battery case to repair the cracks.

In addition, the penetration of the moisture or gas from the outside through the cracks may be minimized, and the electrolyte may be prevented from leaking from the inside to the outside through the cracks.

The effects of the prevent invention are not limited by the aforementioned description, and thus, more varied effects are involved in this specification.

MODE FOR CARRYING OUT THE INVENTION

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "comprising" does not exclude other components besides a mentioned component.

Hereinafter, preferred embodiments will be described in detail with reference to the accompanying drawings.

Figure 1:
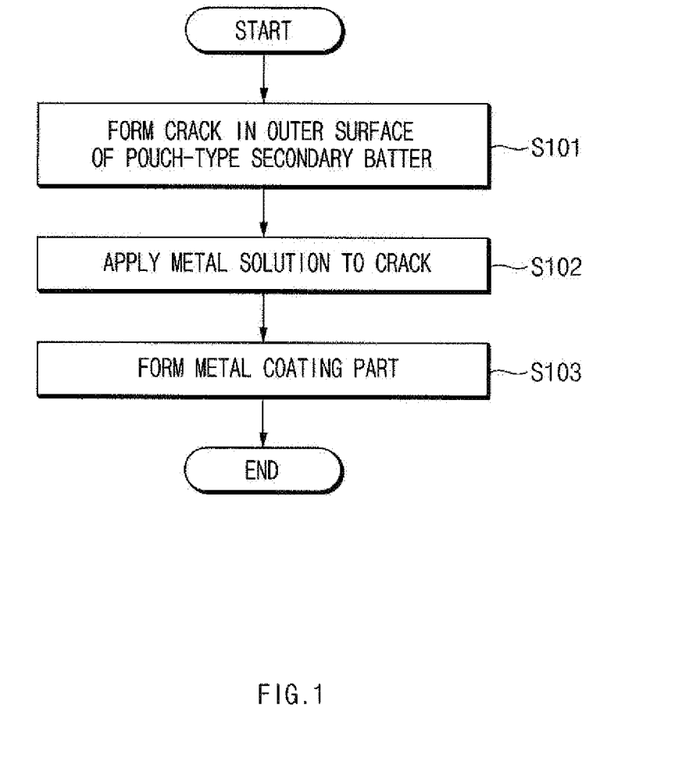
FIG. 1 is a flowchart illustrating a method for repairing a secondary battery according to an embodiment of the present invention.

FIG. 1 is a flowchart illustrating a method for repairing a secondary battery 1 according to an embodiment of the present invention.

According to an embodiment of the present invention, a metal solution may be locally applied to cracks 2 formed in an outer surface of a pouch-type battery case 13 to repair the cracks 2. In addition, penetration of moisture or a gas from the outside through the cracks 2 may be minimized, and an electrolyte may be prevented from leaking from the inside to the outside through the cracks 2.

For this, a method for repairing the secondary battery 1 according to an embodiment of the present invention includes a step, in which cracks 2 are formed in an outer surface of a battery case 13 of the pouch-type secondary battery 1; a step of locally applying a metal solution to the cracks 2; and a step of drying the metal solution to form a coating part 15.

In addition, the secondary battery 1 repaired in this manner includes: an electrode assembly 10 formed by alternately stacking electrodes and separators; a pouch-type battery case 13 accommodating the electrode assembly 10 therein; and a coating part 15 formed to be locally applied on an outer surface of the battery case 13.

Hereinafter, contents of each step of the flowchart illustrated in FIG. 1 will be described with reference to FIGS. 2 to 5.

Figure 2:
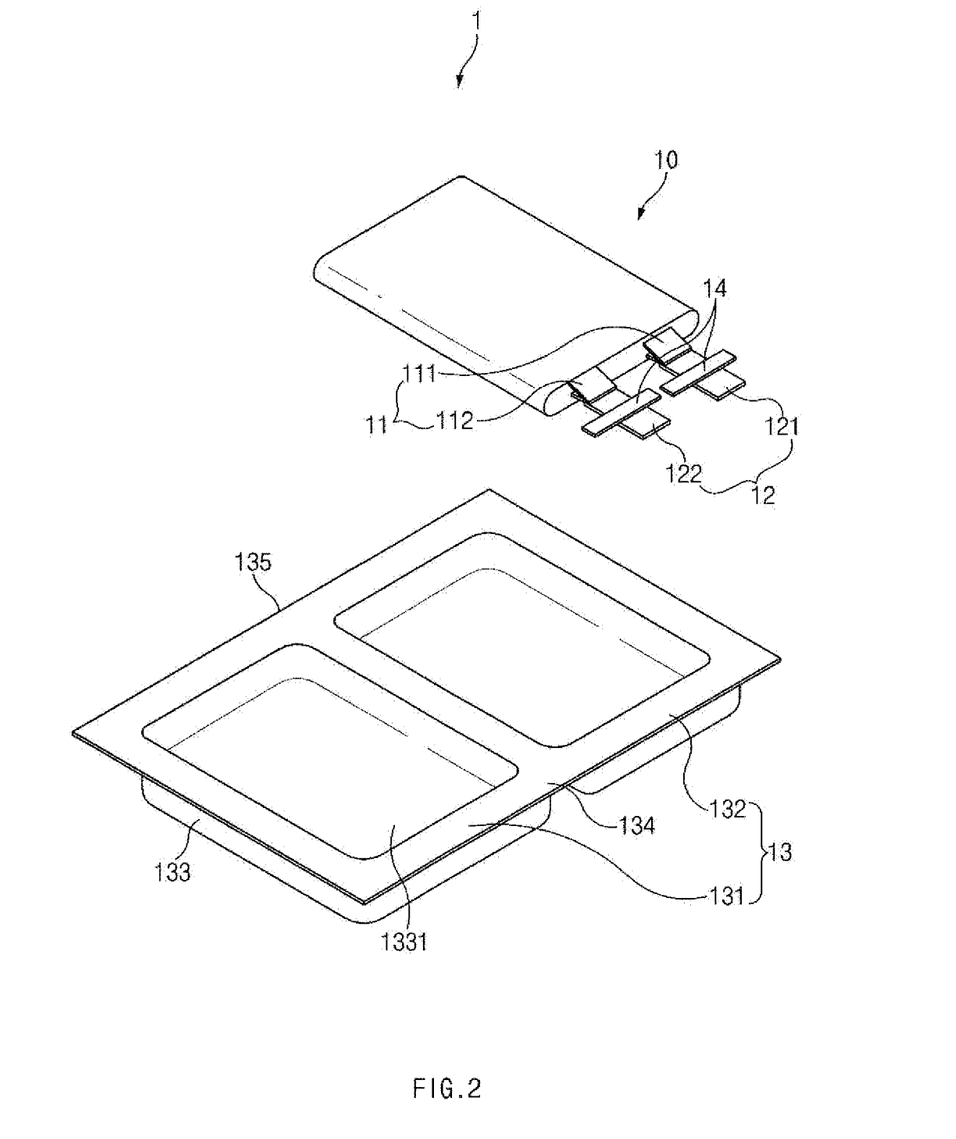
FIG. 2 is an assembled view of the secondary battery according to an embodiment of the present invention.
Figure 3:
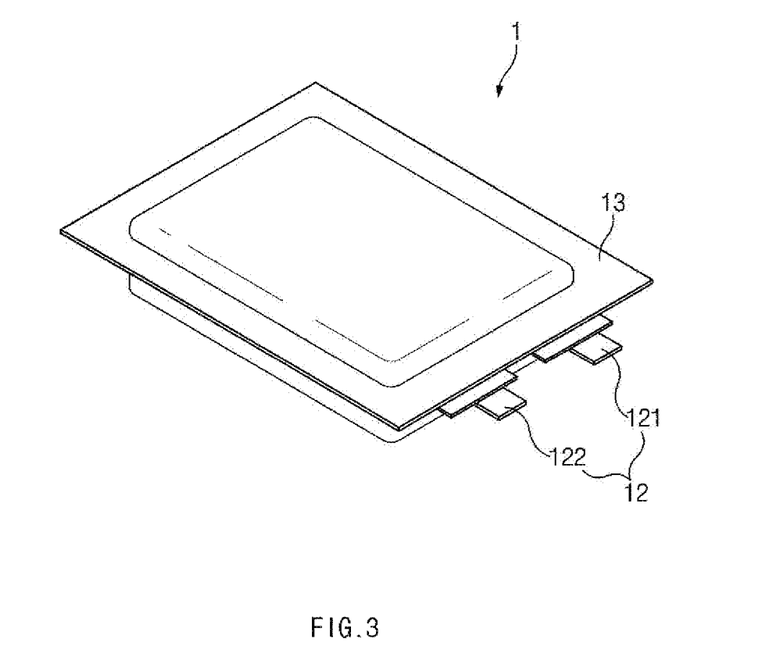
FIG. 3 is a perspective view of the secondary battery according to an embodiment of the present invention.

FIG. 2 is an assembled view of the secondary battery 1 according to an embodiment of the present invention, and FIG. 3 is a perspective view of the secondary battery 1 according to an embodiment of the present invention.

As illustrated in FIG. 2, the pouch-type secondary battery 1 according to an embodiment of the present invention includes an electrode assembly 10, in which electrodes such as a positive electrode and a negative electrode and separators are alternately stacked, and a pouch-type battery case 13 accommodating the electrode assembly 10 therein.

To manufacture the pouch-type secondary battery 1, first, slurry in which an electrode active material, a binder, and a plasticizer are mixed with each other is applied to a positive electrode collector and a negative electrode collector to manufacture electrodes such as a positive electrode and a negative electrode. The electrodes are stacked on both sides of a separator to manufacture the electrode assembly 10 having a predetermined shape. Then, the electrode assembly 10 is inserted into the battery case 13, and the battery case 13 is sealed after injecting an electrolyte therein.

Particularly, the electrode assembly 10 may be a stacked structure including two types of electrodes such as a positive electrode and a negative electrode and a separator disposed between the electrodes to insulate the electrodes from each other or disposed at a left or right side of one electrode. The stacked structure may have various shapes without being limited in shape. For example, the cathode and the anode, each of which has a predetermined standard, may be stacked with the separator therebetween, or the stacked structure may be wound in the form of a jelly roll. Each of the two types of electrodes, i.e., the positive electrode and the negative electrode has a structure in which active material slurry is applied to the electrode collector having a metal foil or metal mesh shape. The slurry may be usually formed by agitating a granular active material, an auxiliary conductor, a binder, and a plasticizer with a solvent added. The solvent may be removed in the subsequent process.

As illustrated in FIG. 2, the electrode assembly 10 includes electrode tabs 11. The electrode tabs 11 are respectively connected to a positive electrode and a negative electrode of the electrode assembly 10 to protrude to the outside of the electrode assembly 10, thereby providing a path, through which electrons are moved, between the inside and outside of the electrode assembly 10. An electrode collector of the electrode assembly 10 is constituted by a portion coated with an electrode active material and a distal end, on which the electrode active material is not applied, i.e., a non-coating part. Also, each of an electrode tabs 11 may be formed by cutting the non-coating part or by connecting a separate conductive member to the non-coating part through ultrasonic welding. As illustrated in FIG. 2, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 that supplies electricity to the outside of the secondary battery 1 is connected to the electrode tab 11 through spot welding. Also, a portion of the electrode lead 12 is surrounded by an insulating part 14. The insulation part 14 may be disposed to be limited within a sealing part 134, at which an upper case 131 and a lower case 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode leads 12 include a positive electrode lead 121 having one end connected to a positive electrode tab 111 to extend in a direction in which the positive electrode tab 111 protrudes and a negative electrode lead 122 having one end connected to a negative electrode tab 112 to extend in a direction in which the negative electrode tab 112 protrudes. On the other hand, as illustrated in FIG. 2, all of the other ends of the positive electrode lead 121 and the negative electrode lead 122 protrude to the outside of the battery case 13. As a result, electricity generated in the electrode assembly 10 may be supplied to the outside. Also, since each of the positive electrode tab 111 and the negative electrode tab 112 is formed to protrude in various directions, each of the positive electrode lead 121 and the negative electrode lead 122 may extend in various directions.

The positive electrode lead 121 and the negative electrode lead 122 may be made of materials different from each other. That is, the cathode lead 121 may be made of the same material as the cathode collector, i.e., an aluminum (Al) material, and the anode lead 122 may be made of the same material as the anode collector, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material, which accommodates the electrode assembly 10 therein. Hereinafter, the case in which the battery case 13 is the pouch will be described. When a pouch film 135 having flexibility is drawing-molded by using a punch or the like, a portion of the pouch film 135 is stretched to form a cup part 133 including a pocket-shaped accommodation space 1331, thereby manufacturing the battery case 13. The battery case 13 accommodates the electrode assembly 10 so that a portion of the electrode lead 12, i.e., the terminal part is exposed and then is sealed. As illustrated in FIG. 2, the battery case 13 includes the upper case 131 and the lower case 132. An accommodation space 1331 in which a cup part 133 is formed to accommodate the electrode assembly 10 may be provided in the lower case 132, and upper case 131 may cover an upper side of the accommodation space 1331 so that the electrode assembly 10 is not separated to the outside of the battery case 13. Also, the sealing part 134 is sealed to seal the accommodation space 1331. Here, the cup part 133 having the accommodation part 1331 may be formed in the upper case 131 to accommodate the electrode assembly 10 in the upper portion. As illustrated in FIG. 2, one side of the upper case 131 and one side of the lower case 132 may be connected to each other. However, the present invention is not limited thereto. For example, the upper case 131 and the lower case 132 may be separately manufactured to be separated from each other.

When an electrode lead 12 is connected to the electrode tab 11 of the electrode assembly 10, and the insulation part 14 is provided on a portion of the electrode lead 12, the electrode assembly 10 may be accommodated in the accommodation space 1331 provided in the cup part 133 of the lower case 132, and the upper case 131 may cover the accommodation space from the upper side. Also, the electrolyte is injected, and then, as illustrated in FIG. 3, the sealing part 134 extending outward from edges of the upper case 131 and the lower case 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. As illustrated in FIG. 3, the pouch-type secondary battery 1 may be manufactured through the above-described method.

Figure 4:
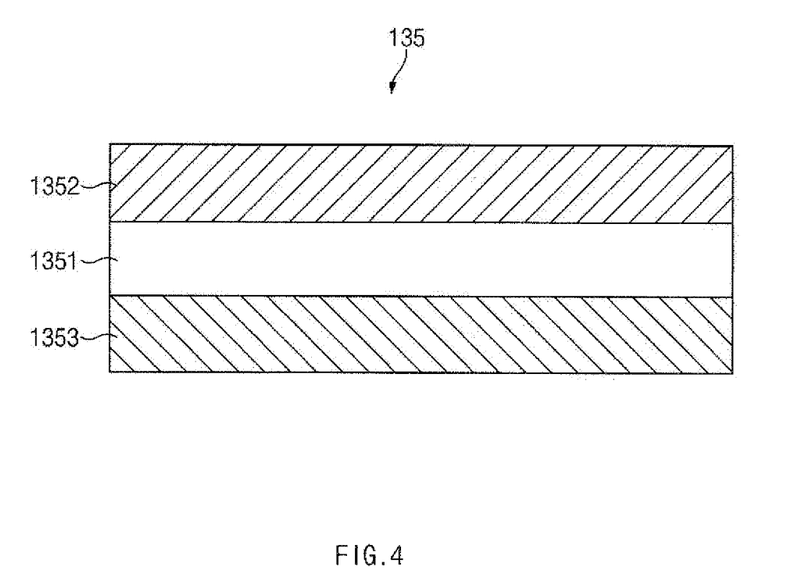
FIG. 4 is a cross-sectional view of a pouch film forming a battery case according to an embodiment of the present invention.

FIG. 4 is a cross-sectional view of a pouch film 135 forming the battery case 13 according to an embodiment of the present invention.

The pouch film 135 may be drawing-molded to manufacture the battery case 13. That is, the pouch film 135 is elongated to form the cup part 133, thereby manufacturing the battery case 13. As illustrated in FIG. 3, the pouch film 135 includes a gas barrier layer 1351, a surface protection layer 1352, and a sealant layer 1353.

The gas barrier layer 1351 may secure mechanical strength of the battery case 13, block introduction and discharge of moisture or a gas to the outside of the secondary battery 1, and prevent the electrolyte from leaking. In general, the gas barrier layer 1351 includes a metal. Particularly, aluminum (Al) foil is mainly used for the gas barrier layer 2351. Aluminum may secure the mechanical strength having a predetermined level or more, but be light in weight. Thus, aluminum may secure complement and heat dissipation for electrochemical properties due to the electrode assembly 10 and the electrolyte. However, the present invention is not limited thereto. For example, the gas barrier layer 1351 may be made of various materials. For example, the gas barrier layer 1351 may be made of one material or a mixture of two or more materials selected from the group consisting of Fe, C, Cr, Mn, Ni and Al. Here, the gas barrier layer 1351 is made of a material containing iron, the mechanical strength may be improved. When the gas barrier layer 1351 is made of a material containing aluminum, flexibility may be improved. Thus, the material forming the gas barrier layer 1351 may be used in consideration of the characteristics of the gas barrier layer 1351.

The surface protection layer 1352 is made of a polymer and disposed at the outermost layer to protect the secondary battery 1 against external friction and collision and also electrically insulates the electrode assembly 10 from the outside. Here, the outermost layer represents a direction opposite to a direction in which the electrode assembly 10 is disposed with respect to the gas barrier layer 1351, i.e., in an outward direction. The surface protection layer 1352 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polymer such as a nylon resin or polyethylene terephthalate (PET) having mainly abrasion resistance and heat resistance is used. Also, the surface protection layer 1352 may have a single layer structure made of one material or a composite layer structure in which two or more materials are respectively formed as layers.

The sealant layer 1353 is made of a polymer and disposed at the innermost layer to directly contact the electrode assembly 10. The pouch-type battery case 13 may be manufactured while a portion thereof is elongated to form the cup part 133 having the accommodation space 1331 having a bag shape when the pouch film 135 having the stacked structure as described above is drawing-molded by using a punch or the like. Also, when the electrode assembly 10 is accommodated in the accommodation space 1331, the electrolyte is injected. Thereafter, when the upper case 131 and the lower case 132 may contact each other, and thermal compression is applied to the sealing part 134, the sealant layers 1353 may be bonded to each other to seal the battery case 13. Here, since the sealant layer 1353 is in direct contact with the electrode assembly 10, the sealant layer 23 has to have insulating properties. Also, since the sealant layer 23 is in contact with the electrolyte, the sealant layer 23 has to have corrosion resistance. Also, since the inside of the battery case 13 is completely sealed to prevent materials from moving between the inside and outside of the battery case 13, high sealability has to be realized. That is, the sealing part 134 in which the sealant layers 1353 are bonded to each other should have superior bonding strength. In general, the sealant layer 1353 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polyolefin-based resin such as polypropylene (PP) or polyethylene (PE) is used for the sealant layer 23. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 1353. Furthermore, the sealant layer 23 may be made of a cated polypropylene or a polypropylene-butylene-ethylene terpolymer. Also, the sealant layer 1353 may have a single layer structure made of one material or a composite layer structure in which two or more materials are respectively formed as layers.

Figure 5:
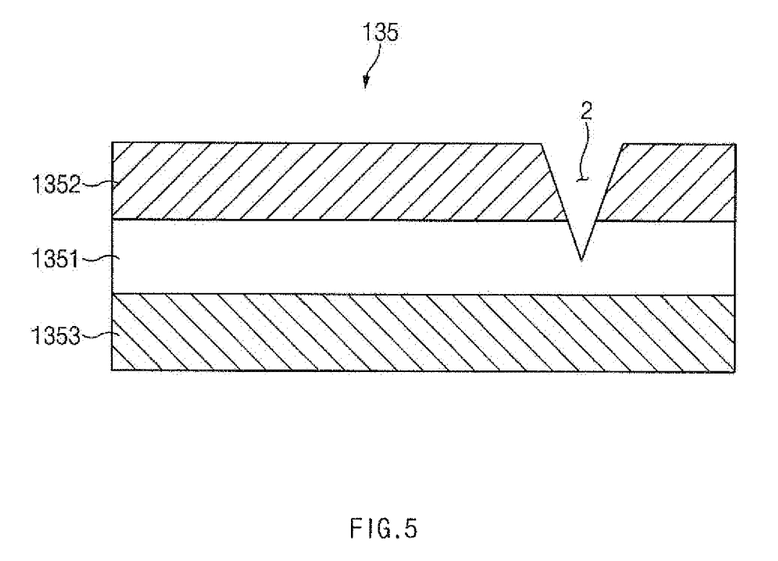
FIG. 5 is a view illustrating a state in which cracks are formed in an outer surface of the battery case according to an embodiment of the present invention.

FIG. 5 is a view illustrating a state in which the cracks 2 are formed in the outer surface of the battery case 13 according to an embodiment of the present invention.

As described above, in the pouch-type secondary battery 1, the pouch-type battery case 13 has high flexibility but low rigidity. Thus, damage such as the formation of the cracks 2 may easily occur in the outer surface by a sharp object from the outside or when forming the cup part to form the cup part, or sealing the sealing part (S101). In general, the cracks 2 are frequently formed when molding the pouch film 135 or sealing the sealing part, and thus, the cracks 2 are frequently formed at edges or corners of the battery case 13. As illustrated in FIG. 5, the crack 2 may be formed not only in the surface protection layer 1352 but also in the gas barrier layer 1351. The gas barrier layer 1351 may block the introduction and discharge of external moisture or gas. When the cracks 2 are formed in the gas barrier layer 1351, the moisture or gas may leak to the outside or be penetrated from the outside through the portions in which the cracks 2 are formed.

Figure 6:
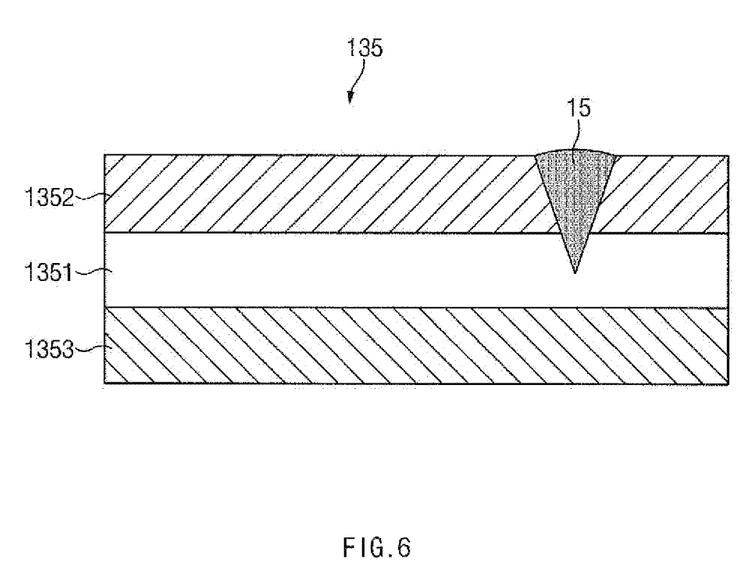
FIG. 6 is a view illustrating a state in which a metal solution is applied to the cracks formed in the outer surface of the battery case to form a coating part according to an embodiment of the present invention.

FIG. 6 is a view illustrating a state in which a metal solution is applied to the cracks 2 formed in the outer surface of the battery case 13 to form a coating part 15 according to an embodiment of the present invention.

According to an embodiment of the present invention, a metal solution is locally applied to the cracks 2 formed in the outer surface of the pouch-type battery case 13 (S102).

The metal solution may be a solution containing fine metal particles and have viscosity to a certain extent, and when applied to the outer surface of the battery case 13, the adhesion state may be maintained. Metal particles contained in the metal solution may be one material or a mixture of two or more materials selected from the group consisting of iron (Fe), carbon (C), chromium (Cr), manganese (Mn), nickel (Ni), and aluminum (Al), and it is particularly preferable to include aluminum. That is, the metal solution may be aluminum (Al) paint containing aluminum powder.

The metal solution may be applied through at least one of spray coating, roll coating, dip coating, slide coating, spin coating, curtain coating, slot coating, or gravure coating. That is, the present invention is not limited thereto, and various coating methods may be used. Particularly, in order to locally apply the metal solution only to the cracks 2 formed in the outer surface of the battery case 13, it is preferable to use a spray coating method. Specifically, a tape may be attached on a peripheral area of the cracks 2 to perform masking, and the metal solution is applied using the spray coating method. Thereafter, the tape may be reduced to complete the applying of the metal solution.

According to another embodiment of the present invention, before applying the metal solution, a colored solution to which a colored dye is added may be applied first. If the colored solution containing the colored dye is applied to the cracks, the cracks may be more clearly identified with the naked eye, and thus, it may be easy to determine whether or not to apply the metal solution and a position to which the metal solution is applied. As described above, in general, the cracks 2 are frequently formed at the edges or corners of the battery case 13 when molding the pouch film 135 or sealing the sealing part. Therefore, after molding the pouch film 135 or sealing the sealing part, the colored solution may be applied to the edges or corners of the battery case 13. These colored dyes may have various colors, but in the case of a primary color such as a red or blue color or a dark color such as a black color, the cracks may be more clearly identified, which is preferable.

After applying the metal solution, the metal solution is dried. As a result, as illustrated in FIG. 6, the coating part 15 to be locally applied to the cracks 2 formed in the outer surface of the battery case 13 is formed (S103). According to another embodiment of the present invention, since the colored solution is first applied before applying the metal solution, the coating part 15 includes a first coating part (not shown) and a second coating part (not shown). Also, the first coating part contains the colored solution since the first coating part is formed by applying the colored solution. The first coating part is formed on the cracks 2 before the second coating part is formed, and since the second coating part is formed by applying the metal solution, the second coating part contains metal particles and is formed on an outer surface of the first coating part. Since this first coating part is applied to check whether the cracks 2 occur and positions of the cracks 2, the first coating part may be relatively widely formed, and since the second coating part is applied to repair the cracks 2, the second coating part may be relatively narrowly formed.

As described above, since the metal solution is locally applied only to the cracks 2 formed in the outer surface of the battery case 13, the coating part 15 may be also locally applied to the outer surface of the battery case 13 as illustrated in FIG. 6. As described above, since the metal solution contains the metal particles, the coating part 15 may also contain the metal particles, in particular, may preferably contain aluminum. Also, when drying the metal solution, it is preferable to dry for 20 hours to 28 hours. The pouch-type secondary battery 1 in which the cracks 2 are formed may be repaired through the above-described method.

Manufacturing Example

A pouch film, in which a surface protection layer manufactured by stacking PET having a thickness 12 μm and Nylon having a thickness of 15 μm has a thickness of 27 μm, a gas barrier layer made of aluminum has a thickness of 40 μm, and a sealant layer made of polypropylene has a thickness 80 μm, was prepared. The pouch film was drawing-molded to manufacture a battery case, and then, an electrode assembly and an electrolyte were accommodated in the battery case to be sealed. Here, a concentration of hydrogen fluoride (HF) in the electrolyte was 105.4 ppm. Thus, the pouch-type secondary battery having a width of 133 mm and a length of 125 mm was manufactured.

A crack having a length of 1 cm and a depth of 73 μm was formed in the pouch-type secondary battery manufactured as described above by using a cutter knife. Also, aluminum paint containing 10% to 20% of aluminum powder was locally sprayed and applied to the crack. Thereafter, the pouch-type secondary battery was dried for 24 hours to be repaired.

Comparative Example 1

It was manufactured in the same manner as in Manufacturing Example, except that an instant adhesive is applied to a formed crack.

Comparative Example 2

It was manufactured in the same manner as in Manufacturing Example, except that no crack is formed, and an aluminum paint is not applied.

Method for Measuring Physical Property—Change in HF Concentration

The samples of the pouch-type secondary battery, which are manufactured according to Manufacturing Example, Comparative Example 1, and Comparative Example 2, were stored at a temperature of 60° and a humidity of 90%. Also, after one week has elapsed, each sample was disassembled to extract an electrolyte. Then, 1 ml of each electrolyte was put into an acid-base measuring device (manufacturer: Metrohm, model name: 848 Titrino plus), and a change in concentration of hydrogen fluoride (HF) contained in the electrolyte was measured.

Results of Measuring Physical Property—Change in HF Concentration

TABLE 1

|  | HF Final concentration (ppm) | HF Concentration increase amount (ppm) |
| --- | --- | --- |
| Manufacturing Example | 350.0 | 244.6 |
| Comparative Example 1 | 775.0 | 669.6 |
| Comparative Example 2 | 295.8 | 190.4 |

Figure 7:
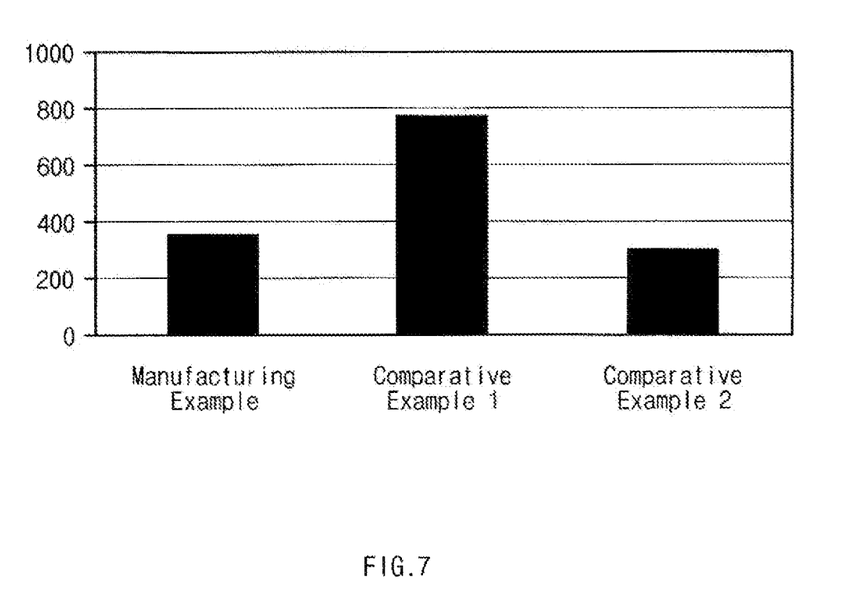
FIG. 7 is a graph illustrating a change in concentration of hydrogen fluoride (HF) within a secondary battery according to Manufacturing Example and a secondary battery according to Comparative Examples 1 and 2.

FIG. 7 is a graph illustrating final concentrations of hydrogen fluoride (HF) within a secondary battery according to Manufacturing Example and a secondary battery according to Comparative Examples 1 and 2. In general, since the electrolyte contains a large amount of fluorine (F), the electrolyte is combined with moisture to produce hydrogen fluoride (HF). Thus, a degree of penetration of the moisture may be determined through the increase in amount of hydrogen fluoride (HF) in the electrolyte.

As illustrated in FIG. 7 and shown in Table 1, in the secondary battery according to Comparative Example 2, a concentration of hydrogen fluoride (HF) in the internal electrolyte was measured to be 295.8 ppm, and thus, an increase of 190.4 ppm was derived. Although the secondary battery according to Comparative Example 2 was a secondary battery in which no crack was formed, the concentration of hydrogen fluoride (HF) increased. That is, even in the normal secondary battery, it was confirmed that the concentration of hydrogen fluoride (HF) naturally increases under high temperature and high humidity environments.

However, in the secondary battery according to Manufacturing Example of the present invention, the concentration of hydrogen fluoride (HF) was measured to be 350.0 ppm, and an increase of 244.6 ppm was derived. That is, the secondary battery in which the crack was repaired using the aluminum paint did not significantly increase in concentration of hydrogen fluoride (HF) when compared to that of the normal secondary battery.

On the other hand, in the secondary battery according to Comparative Example 1, the concentration of hydrogen fluoride (HF) was measured to be 775.0 ppm, and an increase of 669.6 ppm was derived. That is, in the secondary battery in which the crack was repaired using a general polymer adhesive such as the instant adhesive, the concentration of hydrogen fluoride (HF) significantly increased when compared to that of the normal secondary battery.

Therefore, when the crack is repaired using the general polymer adhesive, the moisture or gas may be easily penetrated from the outside through the crack. However, it may be seen that when the crack is repaired using the aluminum paint, the penetration of the moisture or gas from the outside through the crack may be minimized.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

[Description of the Symbols]

| | |
|---|---|
| 1: Secondary battery | 2: Crack |
| 10: Electrode assembly | 11: Electrode tab |
| 12: Electrode lead | 13: Battery case |
| 14: Insulation part | 15: Coating part |
| 111: Positive electrode tab | 112: Negative electrode tab |
| 121: Positive electrode lead | 122: Negative electrode lead |
| 131: Upper case | 132: Lower case |

[Description of the Symbols]

| | |
|---|---|
| 133: Cup part | 134: Sealing part |
| 135: Pouch film | 1331: Accommodation space |
| 1351: Gas barrier layer | 1352: Surface protection layer |
| 1353: Sealant layer | |

The invention claimed is:

1. A secondary battery comprising:
an electrode assembly formed by alternately stacking electrodes and separators;
a pouch-type battery case accommodating the electrode assembly therein; and
a coating part containing metal particles locally applied to an outer surface of the battery case,
wherein the coating part comprises a first coating part containing a colored dye and a second coating part containing the metal particles and disposed on an outer surface of the first coating part.

2. The secondary battery of claim 1, wherein the coating part is disposed within a crack extending into the outer surface of the battery case.

3. The secondary battery of claim 2, wherein the crack is formed in an edge or a corner of the battery case.

4. The secondary battery of claim 1, wherein the coating part comprises aluminum.

5. The secondary battery of claim 1, wherein the first coating part extends across a first area of an outer surface of the pouch-type battery case, and the second coating part extends across a second area of the outer surface of the pouch-type battery case, the first area being greater than the second area.

* * * * *